United States Patent Office 3,498,941
Patented Mar. 3, 1970

3,498,941
POLYMERIC DISPERSIONS OF A POLYOLEFIN WITH AN INCOMPATIBLE POLYMER AND A POLYAMIDE DISPERSING AGENT
Martin Richard Hofton, Worthing, Clifton Douglas Cowell, Panteg, near Ponty-Pool, and Eric John Page, Gilwern, near Abergavenny, England, assignors to Imperial Chemical Industries Limited, London, England, a corporation of Great Britain
No Drawing. Filed Aug. 22, 1966, Ser. No. 578,948
Int. Cl. C08f 15/00, 19/00, 25/00
U.S. Cl. 260—22
2 Claims

ABSTRACT OF THE DISCLOSURE

A process for producing the dispersion of a polyhydrocarbon such as polyethylene or polypropylene in an incompatible polymer such as nylon in which the polymer in the disperse phase has an average particle size not exceeding 25 microns. The process consists of mixing the two polymers together in the presence of a polymeric dispersing agent composed of large molecules formed by the union of groups of small molecules and having a molecular weight of at least 1000. The polymeric dispersing agent is exemplified by a copolymer of di-linoleic acid, adipic acid and hexamethylene diamine; polyaminoundecanoic acid; polyhexamethylene sebacamide; a copolyamide of 11 N-hexadecylaminoundecanoic acid and e-caprolactam; copolyamide of di-linoleic acid, e-caprolactam and hexamethylene diamine; copolyamide of N-monosubstituted diamine, sebacic acid, and e-caprolactam; and copolyamide of 11 N-(2-tridecyl)aminoundecanoic acid with e-caprolactam.

---

This invention relates to the dispersion of polymeric materials and to the product derived from the dispersions and is particularly concerned with the dispersion of polyhydrocarbons in other polymeric materials such as polyamides and polyesters and to the products, particularly filaments, obtained from the resulting dispersions.

Mixtures of polyhydrocarbons with polymeric materials with which the hydrocarbon can be considered as incompatible, such as polyamides and polyesters, have been prepared, and in the specification of British Patent No. 956,926 there is described a method of combining polyhydrocarbons with polyamides, involving mixing them together under heat and pressure, which results in the formation of an essentially homogeneous mass.

The applicant has found, as described in the copending application No. 43,464/64, that the utility of mixtures of polyhydrocarbons with incompatible polymeric materials in certain diversified applications, but particularly from the standpoint of melt spinning the mixtures by conventional techniques into filaments, is enhanced when the mixture takes the form of a dispersion of one of the polymer components in another polymer component in which dispersion the particle size of the polymer component constituting the disperse phase of the dispersion does not exceed 25 microns in diameter.

The dispersion of one of the polymers in the other is preferably attained by mixing the two in the presence of a quantity of a dispersing agent and the polymers are preferably mixed together in the presence of a minor proportion, relative to the total weight of the mixture, of a polymeric dispersing agent.

The expression "polymeric dispersing agent" is used in this specification to describe a substance, preferably synthetic, composed of large molecules formed by the union of groups of small molecules and having a molecular weight of at least 1,000.

Accordingly, this invention in one of its aspects comprises a process producing a mixture of a polyhydrocarbon with an incompatible polymer in the form of a dispersion of one of the polymers in the other in which the polymer of the disperse phase has an average particle size not exceeding 25 microns wherein the two polymers are mixed together in the presence of a polymeric dispersing agent as hereinbefore defined.

The process by which the dispersion is formed from the mixture of polyhydrocarbons and incompatible polymers, and which is embraced by the present invention, can conveniently be practiced by heating a mixture of the polyhydrocarbon and an incompatible polymer in an inert atmosphere, and stirring the mixture in the presence of a minor proportion of a polymeric dispersing agent.

Generally speaking, in producing the dispersion by combining the mutually incompatible polymers in the presence of the polymeric dispersing agent, conventional apparatus such as a two-roll mill, or a Banbury mixer or a screw extruder in which the blending is accomplished through the shear action of the screw, is entirely suitable. The polymers could also be mixed in a conventional melt spinning apparatus using the mixing action of a metering pump.

In the practice of this invention any combination of a polyhydrocarbon and an incompatible polymer may be employed, although when the resulting dispersion is to be processed by melt-spinning techniques to form filaments it is desirable that the two polymers should have similar melt viscosities. Differences in the melt viscosities of the two polymers can lead to filaments exhibiting significant denier fluctuations when the dispersion is melt spun.

Among suitable hydrocarbons for use in this invention mention may be made of a high density polyethylene prepared, for example, by a low pressure polymerisation technique using conventional catalysts, a low density polyethylene prepared by a high pressure technique, and isotactic polypropylene.

We prefer that the incompatible polymer should be one amenable to melt spinning. Among such polymers, all of which are suitable for use in this invention, mention may be made of polyamides, such, for example, as polyhexamethylene adipamide, polyepsilon caprolactam, polyomega-aminoundecanoic acid, and their copolymers, polyesters including polyethylene terephthalate and copolyesters, polycarbonates, polyurethanes and polyureas.

While it is considered on the basis of experimental information at present available that a variety of polymeric materials, provided they are not excessively volatile, can be used as dispersing agents in this invention, we have found that polyamides and copolyamides are particularly efficacious in this context. Suitable polyamides include the polyomega-aminoundecanoic acid (nylon 11) available commercially under the registered trademark "Rilsan."

Among suitable copolyamides mention may be made of N-substituted, particularly N-alkylated, copolyamides derived from the reaction of a lactam, for example, epsiloncaprolactam with various N-alkyl-omega-amino-undecanoic acids and optionally the corresponding unsubstituted omega-amino carboxylic acids, or N-mono-or N,N¹-disubstituted aliphatic diamines and a dibasic carboxylic acid. Another suitable copolyamide is prepared by copolymerising the reaction product of a long chain fatty acid such as the di-linoleic acid, available commercially as Empol dimer acid, and a substituted or unsubstituted diamine, such, for example, as hexamethylene diamine, with a lactam such as epsilon caprolactam or with the salt of dicarboxylic acid and a diamine such as hexamethylene diammonium adipate.

The efficacy of the polyamides and copolyamides in dispersing mixtures of polyhydrocarbons and polyamides is considered to be attributable to the presence therein of a moiety compatible with the polyhydrocarbon constituent of the dispersion and a moiety compatible with the other polymer constituent.

Quite apart from their role in providing a dispersion characterised by a unique particle size and a uniform distribution thereof, the polymeric dispersing agents assist in the formation of the dispersion and obviate the necessity for prolonged mixing at elevated temperatures and pressures, all of which are deleterious in their effect on the final product.

Conveniently, the amount of polymer present as the dispersing agent does not exceed 10 percent by weight and preferably less than 5 percent by weight based on the total weight of the dispersion.

The dispersions of this invention find application in many diverse end uses, for instance in the making of films and sheets from which wrapping or packaging materials may be derived, but they are pre-eminently suited to those applications in which the unique nature of the dispersion, in particular the small particle size of the particles of the disperse phase and the uniform or substantially uniform distribution thereof throughout the dispersion medium, finds expression. Thus, the dispersons may be melt-spun by conventional techniques into filaments. The filaments so obtained are of textile deniers and consist of a matrix of one polymeric material derived from the dispersion medium and particles of the other polymeric material derived from the disperse phase distributed therethrough in a more or less uniform manner.

These filaments and the fibres therefrom constitute another aspect of this invention. The properties of the filaments vary in dependence upon the proportions of the constituents of the dispersion. For instance, filaments derived from a dispersion of 25 percent by weight of polyethylene and 75 percent by weight of a polyamide are characterised by the following properties.

| | |
|---|---|
| Denier, not exceeding | 20 |
| Tenacity (gms./denier) (approximately) | 6 |
| Extensibility (percent) (approximately) | 16 |
| Initial modulus (gms./denier) (approximately) | 27 |

The present invention is illustrated but in no manner limited by the following examples:

EXAMPLE 1

The polymeric dispersing agent utilised in the process described in this example was a copolyamide obtained by the copolymerisation of the di-linoleic acid colloquially known as Empol dimer acid and hexamethylene diamine with hexamethylene diammonium adipate and made by taking together the following ingredients:

| | Gms. |
|---|---|
| Empol dimer acid | 13.9 |
| Hexamethylene diamine | 2.87 |
| Hexamethylene diammonium adipate | 39.13 |
| Phenol | 27.95 |

The above ingredients were added to a vessel which was purged with nitrogen and then sealed. The vessel was heated for a period of 7 hours at a temperature of 225° C. in a furnace with provision for continuously agitating the contents of the vessel. The vessel was then opened and the heating continued at a temperature of 285° C. for a further period of 1 hour at atmospheric pressure and with a stream of nitrogen being passed through the vessel. In the course of this further heating, the phenol, which functioned as a diluent to ensure effective copolymerisation, was distilled off. The resulting copolyamide was broken up into chips which were subsequently granulated.

75 parts by weight (71 parts by volume) of polyhexamethylene adipamide chip, possessing a relative viscosity of 36, 25 parts by weight (29 parts by volume) of low density polyethylene chip sold by Imperial Chemical Industries under the registered trademark "Alkathane" and having a melt flow index of 20, and 3 parts by weight of the copolyamide dispersing agent prepared as described above were blended together in the following manner.

The three components were introduced into a glass container in which they were tumbled for a short time and then transferred to a glass mixing vessel containing a stainless steel helical stirrer. The mixing vessel was evacuated and refilled with nitrogen to remove all oxygen, and throughout the mixing and subsequent cooling a steady flow of nitrogen was maintained over the surface of the mixture. The tube was immersed in an oil bath at a temperature of 280°–285° C., i.e. 15°–20° above the melting point of the polyhexamethylene adipamide component, and rapid stirring commenced as soon as that polymer and the lower melting polyethylene had melted, and then continued for 30 minutes.

As a result of this heat treatment with continuous agitation a dispersion of the polyethylene as the disperse phase in polyhexamethylene adipamide as the dispersion medium was obtained. At the end of the 30 minute period the mixing vessel was removed from the oil bath and allowed to cool. The dispersion of the one polymer in the other, which may conveniently be referred to as the dispersion system or polymer blend, solidified on cooling. The polymer blend was then removed and crushed into small pieces.

The average diameter of the polyethylene particles which constituted the disperse phase, was obtained by direct observation of cross-sections of individual pieces under a high resolution microscope containing a graticule eye piece and measuring the mean diameter of the particles in the area of the circle containing the graticule scale. In this example, the average diameter of the polyethylene particles was 2.4 microns.

To highlight the utility of polymeric dispersing agents such as the copolyamide utilised in this example in producing a dispersion or blend processing desirable properties, polyhexamethylene adipamide and polyethylene were mixed together in the same proportions and in the same manner as described above, but in one experiment the mixing was effected in the absence of a dispersing agent.

The polymer blend resulting from mixing the two polymers in the absence of a dispersing agent was not amenable to subsequent processing to produce yarns and all attemps to spin yarn from the polymer blend by conventional melt-spinning techniques failed. We interpret this failure as one consequence of the inadequate dispersion of the polyethylene in the polyhexamethylene adipamide then obtaining.

The dispersion of the polymers was manifestly inadequate relative to that obtaining in the presence of a polymeric dispersing agent, for the average diameter of the polyethylene particles as the disperse phase was 32.5 microns when measured by the same method as described above.

The polymer blend made using the polymeric dispersing agent as described was melt spun into 6 filaments at 275° C. by conventional techniques using a laboratory spinning machine. The filaments were subsequently drawn at a draw ratio of 4.75 over a hot plate at 100° C. to yield a yarn having the following physical properties.

| | |
|---|---|
| Denier | 20.4 i.e. about 4 d.p.f. |
| Tenacity | 6.3 gm./denier. |
| Extension to break | 17.6 percent. |
| Initial modulus | 34.5 gms./denier at 100 percent extension. |

The filaments showed no tendency to fibrillate during or after drawing.

The relative viscosity of the polyamide was determined by measuring the viscosity of an 8.4% w./w. solution of the polyamide in formic acid and comparing this with the viscosity of formic acid under standard conditions.

The melt flow index of polyethylene was determined according to B.S.S. No. 2782, Method 105C.

Polyhexamethylene adipamide of relative viscosity 36 and polyethylene of melt index 20 have similar melt viscosities, about 800 poises, at 280° C.

EXAMPLE 2

The polymeric dispersing agent used in the process of this example was an N-alkylated copolyamide obtained by reacting together 11 N-(2-tridecyl) amino-undecanoic acid and epsilon caprolactam in the amounts, and in the manner, which will now be described.

12.7 gms. of 11 N-(2-tridecyl) amino undecanoic acid was mixed with 33.9 gms. (0.3 M) of epsilon caprolactam and to the mixture there was added, as a catalyst for the subsequent polymerisation reaction, 0.68 gms. (0.003 M) of omega-amino undecanoic acid. The mixture was added to a vessel which was purged with nitrogen and then sealed. The sealed vessel was heated for a period of 4 hours at a temperature of 265° C. in a furnace which was arranged to rock and thereby ensure continuous agitation of the contents of the vessel. The vessel was then opened and the contents heated with continuous stirring at a temperature of 285° C.–300° C. for a period of 2½ hours and in a slow stream of nitrogen. The resulting copolyamide, in which 10 percent of the amide hydrogen atoms were substituted with tridecyl groups, had an inherent viscosity of 0.428 and a Vicat softening range of 178° C.–194° C. The Vicat softening range was determined by a penetrometer similar to the apparatus described by Edgar and Ellery at page 2638 of the Journal of the Chemical Society 1952.

75 parts by weight (71 parts by volume) of polyhexamethylene adipamide having a relative viscosity of 36, 25 parts by weight (29 parts by volume) of low density polyethylene chip having a melt flow index of 20 and 3 parts by weight of the copolyamide, prepared as outlined above, as the dispersing agent were mixed together in the manner set forth in the previous example to yield a dispersion of polyethylene in the polyhexamethylene adipamide.

The polymer blend was melt spun into 6 filaments at a temperature of 275° C. by conventional techniques using a laboratory spinning machine. The filaments were subsequently drawn at a draw ratio of 5.0 over a hot plate of 100° C. to give a yarn having the following properties:

| | |
|---|---|
| Denier | 20.9 |
| Tenacity | 5.9 gms./denier. |
| Extension to break | 16.0 percent. |
| Initial modulus | 26.8 gms./denier at 100 percent extension. |

EXAMPLE 3

The dispersing agent used in the process of this example was a polyaminoundecanoic acid having an inherent viscosity of 0.63 and available commercially under the trade name "Rilsan."

75 parts by weight (71 parts by volume) of polyhexamethylene adipamide in chip form having a relative viscosity of 36, 25 parts by weight (29 parts by volume) of low density polyethylene chip sold by Imperial Chemical Industries under the registered trade mark "Alkathane" and having a melt flow index of 20 and 3 parts by weight of the polyaminoundecanoic acid were mixed together in the manner set forth in Example 1 to yield a dispersion of polyethylene in the polyhexamethylene adipamide. The average diameter of the polyethylene particles which constituted the disperse phase was 10 microns.

The dispersion, also referred to as a polymer blend, was spun at a temperature of 280° C. into a 5 filament yarn which was subsequently drawn at room temperature to 4 times its original length over a plate. The drawn yarn had the properties tabulated below:

| | |
|---|---|
| Denier | 18.6. |
| Extension to break | 26.1 percent. |
| Tenacity | 3.9 gms./denier. |
| Initial modulus | 16.9 gms./denier at 100 percent extension. |

EXAMPLE 4

The procedure of Example 3 was repeated except that the dispersing agent used was a polyhexamethylene sebacamide having an inherent viscosity of 0.93 and the five filament yarn was drawn to 3 times its length over a plate at a temperature of 100° C. The average diameter of the polyethylene particles which constituted the disperse phase was 15 microns and the drawn yarn obtained from the dispersion had the following properties:

| | |
|---|---|
| Denier | 25.6 |
| Tenacity | 2.3 gms./denier. |
| Extension to break | 25 percent. |
| Initial modulus | 13.3 gms./denier at 100 percent extension. |

EXAMPLE 5

The polymeric dispersing agent used in the process of this example was an N-alkylated copolyamide obtained by reacting together 11 N hexadecylaminoundecanoic acid prepared in the manner outlined below and epsilon caprolactam in the presence of an amino carboxylic acid as a catalyst for the condensation reaction.

Preparation of 11 N hexadecylaminoundecanoic acid 1015 gms. (4.2 M) of a commercial grade of cetyl amine (hexadecylamine) were dissolved in industrial methylated spirits by warming on a steam bath. To this hot solution there was added very slowly 158 gms. (0.6 M) of 11 bromoundecanoic acid and the mixture allowed to stand overnight. The reaction mixture was refluxed on a steam bath for a period of 16 hours. With the reaction substantially complete, 5 litres of dry acetone was added to the mixture to throw the 11 N- hexadecylaminoundecanoic acid out of solution. The crude acid so obtained was filtered off and washed several times with water to remove impurities. The acid was thereafter twice recrystallised from industrial methylated spirits to give substantially pure acid (melting point 118° C.) in a yield of 70 percent.

Preparation of the N-alkylated copolyamide 8.5 gms. (0.02 M) of the 11 N hexadecylaminoundecanoic acid was mixed with 20.3 gms. (0.18 M) epsilon caprolactam, and to the mixture there was added as a catalyst for the subsequent polymerisation reaction, 0.6 gms. (0.003 M) omega amino undecanoic acid. The mixture was added to a vessel which was purged with nitrogen and then sealed. The sealed vessel was heated for a period of 4 hours at a temperature of 265° C. in a furnace which was arranged to rock and thereby ensure continuous agitation of the contents of the vessel. The vessel was then opened and the contents heated with continuous stirring at 285° C.–300° C. for a period of 5 hours under a slow stream of nitrogen. The resulting copolyamide in which 10 percent of the amide hydrogen atoms were substituted with hexadecyl groups, had an inherent viscosity of 0.52, and a Vicat softening point of 194° C., and an amine and carboxyl end group content of 82.

75 parts by weight (71 parts by volume) of polyhexamethylene adipamide having a relative viscosity of 36, 25 parts by weight (29 parts by volume) of low density polyethylene chip having a melt flow index of 20 and 3 parts by weight of the copolyamide, prepared as outlined above, as the dispersing agent, were mixed together in the manner set forth in Example 1 to yield a dispersion of polyethylene in the polyhexamethylene adipamide.

The polymer blend was melt spun into 6 filaments at a temperature of 275° C. by conventional techniques using a laboratory spinning machine. The filaments were subsequently drawn at a draw ratio of 4.0 over a hot plate at 100° C. to give a yarn having the following properties:

Denier _____ 25.1.
Tenacity _____ 3.5 gms./denier.
Extension to break _____ 29.5 percent.
Initial modulus _____ 20.7 gms./denier at 100 per cent extension.

EXAMPLES 6–10

In the following examples, polyhexamethylene adipamide and polyethylene were mixed together in the same proportions by weight and in the same manner as in Example 1 using different polymeric dispersing agents each of which was obtained by means of the procedure set forth in the relevant note below and the resulting dispersions were subsequently spun by the method described in Example 1. The five filament yarns so obtained were thereafter drawn and certain properties of a number of the drawn yarns measured. Details of the various examples and the properties of the yarns where measured are tabulated below:

Example 8

The copolyamide dispersing agent used in this example was an N-alkylated copolyamide made in the manner described more fully hereinafter from an N-monosubstituted diamine (Duomeen T) and caprolactam.

Commercial grade Duomeen T can be obtained from Armour Hess Chemicals Ltd., Leeds and it is believed to consist of a diamine of the formula:

$$RNHCH_2CH_2CH_2NH_2$$

where R is a mixture of myristyl (C14), palmityl (C16), stearyl (C17) and oleyl (C188) redicals.

The commercial grade Duomeen T was recrystallised twice from low boiling petroleum ether. The resulting diamine had a melting point of 69° C.–70° C. and contained 5730 amine equivalents per $10^6$ gms. The salt of the diamine with sebacic acid was prepared by adding 20 gms. of the acid dissolved in 50 ccs. of methanol to 36 gms. of purified Duomeen T dissolved in 25 ccs. of methanol. The solution was diluted with 1500 ccs. of dry ether and then allowed to stand for a period of 16 hours at a temperature of 0° C. At the end of the 16 hour period, 44 gms. of the salt (melting point 57° C.) of the following analysis precipitated out:

TABLE 1

| Example | Polymeric dispersing agent | Average diameter of polyethylene particles of the disperse phase | Draw ratio | Draw temperature, °C. | Yarn properties | | |
|---|---|---|---|---|---|---|---|
| | | | | | Denier | Tenacity, gms./denier | Extension to break, percent | Initial modulus, gms./denier |
| 6 | A copolyamide | 3.6 | 4.0 | 100 | 21.4 | 3.2 | 22.3 | 17.7 |
| 7 | do | 5 | 4.5 | 100 | 19.9 | 4.6 | 18.3 | 24.5 |
| 8 | An N-alkylated copolyamide (10% substitution) | 4.8 | 2.0 | 100 | | | | |
| 9 | An N-alkylated copolyamide (20% substitution) | 9.7 | | | | | | |
| 10 | An N-alkylated copolyamide (25% substitution) | 2.4 | | | | | | |

NOTES ON TABLE 1

Example 6

The copolyamide dispersing agent of this example was obtained by the copolymerisation of Empol dimer acid and hexamethylene diamine with epsilon caprolactam and made by reacting together, in a manner which will now be described, the following ingredients:

18.1 gms. of Empol dimer acid was mixed with 3.62 gms. of hexamethylene diamine and 31.75 gms. of epsilon caprolactam. The mixture was added to a vessel which was purged with nitrogen and then sealed. The sealed vessel was heated for a period of 7 hours at 225° C. in a furnace arranged to rock from side to side thereby agitating the contents of the vessel. The vessel was then opened and the contents heated with continuous stirring at a temperature of 260° C. for a period of 1½ hours in a slow stream of nitrogen. The resulting copolyamide had an inherent viscosity of 0.457, a Vicat softening point of 176° C., an amine end group content of 134 and a carboxyl end group content of 115.

Example 7

The copolyamide dispersing agent of this example was obtained from the same reactants, and in similar manner, to that described for the copolyamide of the previous example, except that the reactants were used in the following amounts:

|  | Gms. |
|---|---|
| Empol dimer acid | 12.6 |
| Hexamethylene diamine | 2.52 |
| Epsilon caprolactam | 46.7 |

The copolyamide had an inherent viscosity of 0.588, a Vicat softening point of 191° C., and amine end group content of 102 and a carboxyl end group content of 40.

Amine end group content:
 (per $10^6$ gms.)—3553 (Theoretical 3558)
Carboxyl end group content:
 (per $10^6$ gms.)—3543 (Theoretical 3543)

11.2 gms. of the salt of Duomeen T and sebacic acid were mixed with 18.08 gms. (0.16 M) of caproloctam and the mixture added to a vessel which was purged with nitrogen and then sealed. The sealed vessel was heated for a period of 5 hours at a temperature of 265° C. in a furnace which was arranged to rock and thereby continuously agitate the contents of the vessel. The vessel was then opened and the contents heated with constant stirring at a temperature of 285° C.–300° C. for a period of 5 hours under a slow stream of nitrogen. The resulting copolyamide in which 10 percent of the amide hydrogen atoms were substituted with mixed alkyl groups, had an inherent viscosity of 0.326 and a Vicat softening range (determined in the manner of Example 2) of 150°–165° C.

Example 9

The copolyamide dispersing agent used in this example was an N-alkylated copolyamide made in a similar manner to that described with reference to the previous example except that the reactants were mixed in the following amounts:

|  | Gms. |
|---|---|
| Duomeen T sebacamide (salt of Duomeen T, obtained as in Example 8 and sebacic acid) | 11.24 |
| Epsilon caprolactam | 6.78 |

The polymer in which 20 percent of amide hydrogen atoms carried alkyl substituents had an inherent viscosity of 0.214 and a Vicat softening range of 44° C.–47° C.

Example 10

The copolyamide dispersing agent used in this example was an N-alkylated copolyamide made in a similar manner to that described with reference to Example 8 except that the reactants were mixed in the following amounts:

|  | Gms. |
|---|---|
| Duomeen T sebacamide (salt of Duomeen T, obtained as in Example 8 and sebacic acid) | 22.4 |
| Epsilon caprolactam | 9.0 |

The polymer in which 25 percent of the amide hydrogen atoms carried alkyl substituents had an inherent viscosity of 0.18 and a Vicat softening range of 43° C.–51° C.

Example 11

85 gms. of polyhexamethylene adipamide (I.V. 0.95) was mixed with 28 gms. of polypropylene and to this mixture there was added 1.12 gms. of the copolyamide made as in Example 6 as the dispersing agent. The mixture was added to a vessel which was purged with nitrogen and then sealed. The sealed vessel was heated for a period sufficient to melt the polymer constituent after which the vessel was open and the contents stirred under a blanket of nitrogen at a temperature of 300° C. for a period of 15 minutes.

The dispersion (polymer blend) so obtained had the following analysis.

| | |
|---|---|
| Amine end group content | 34 |
| Carboxyl end group content | 33 |
| I.V. end group content | 0.89 |

Chips derived from the dispersion were dried and then spun at a temperature of 280° C. into a five filament yarn which was subsequently drawn at room temperature to 4 times its original length over a plate. The drawn had the following properties:

|  | Before treating it with boiling water | After treating it with boiling water |
|---|---|---|
| Denier | 28 | 32 |
| Breaking load | 103 | 115 |
| Extensibility (percent) | 22 | 35 |
| Initial modulus (gms. per denier) | 23 | 14 |
| Boiling water shrinkage (percent) |  | 11.2 |

What we claim is:

1. A process for making a dispersion of particles of a polyhydrocarbon which is a polymer of an α-olefin containing 2–3 carbon atoms in an incompatible polymer selected from the group consisting of polyepsiloncaprolactam, polyhexamethylene adipamide, polyesters, polycarbonates, polyurethanes and polyureas which incompatible polymer forms a matrix in which said polyhydrocarbon particles are dispersed and in which dispersion the average particle size of the disperse phase is less than 25 microns which comprises mixing the two polymers together in the presence of up to 10% by weight of a polymeric dispersing agent selected from the group consisting of (1) copolymer of di-linoleic acid, adipic acid and hexamethylene diamine, (2) polyaminoundecanoic acid, (3) polyhexamethylene sebacamide, (4) copolyamide of 11 N-hexadecylaminoundecanoic acid and epsilon caprolactam, (5) copolyamide of di-lineoleic acid, epsilon caprolactam and hexamethylene diamine, (6) copolyamide of N-monosubstituted diamine, sebacic acid and epsilon caprolactam, and (7) copolyamide of 11 N-(2-tridecyl)aminoundecanoic acid and epsilon caprolactam.

2. A polymer mixture made according to claim 1.

References Cited

UNITED STATES PATENTS

| | | | |
|---|---|---|---|
| 3,298,977 | 1/1967 | Robertson | 260—857 |
| 3,328,484 | 6/1967 | Lugaz | 260—857 |
| 3,359,344 | 12/1967 | Fuhushima | 260—857 |
| 3,373,222 | 3/1968 | Armstrong | 260—857 |
| 3,373,223 | 3/1968 | Armstrong | 260—857 |
| 3,373,224 | 3/1968 | Mesnobian | 260—857 |
| 3,380,953 | 4/1968 | Fuhushima | 260—857 |

FOREIGN PATENTS 713,639  7/1965  Canada.

SAMUEL H. BLECH, Primary Examiner
PAUL LIEBERMAN, Assistant Examiner

U.S. Cl. X.R.

260—18, 23, 859, 873, 857